Jan. 8, 1946.                C. POOL                2,392,501
                        VALVE CONSTRUCTION
                       Filed April 23, 1943
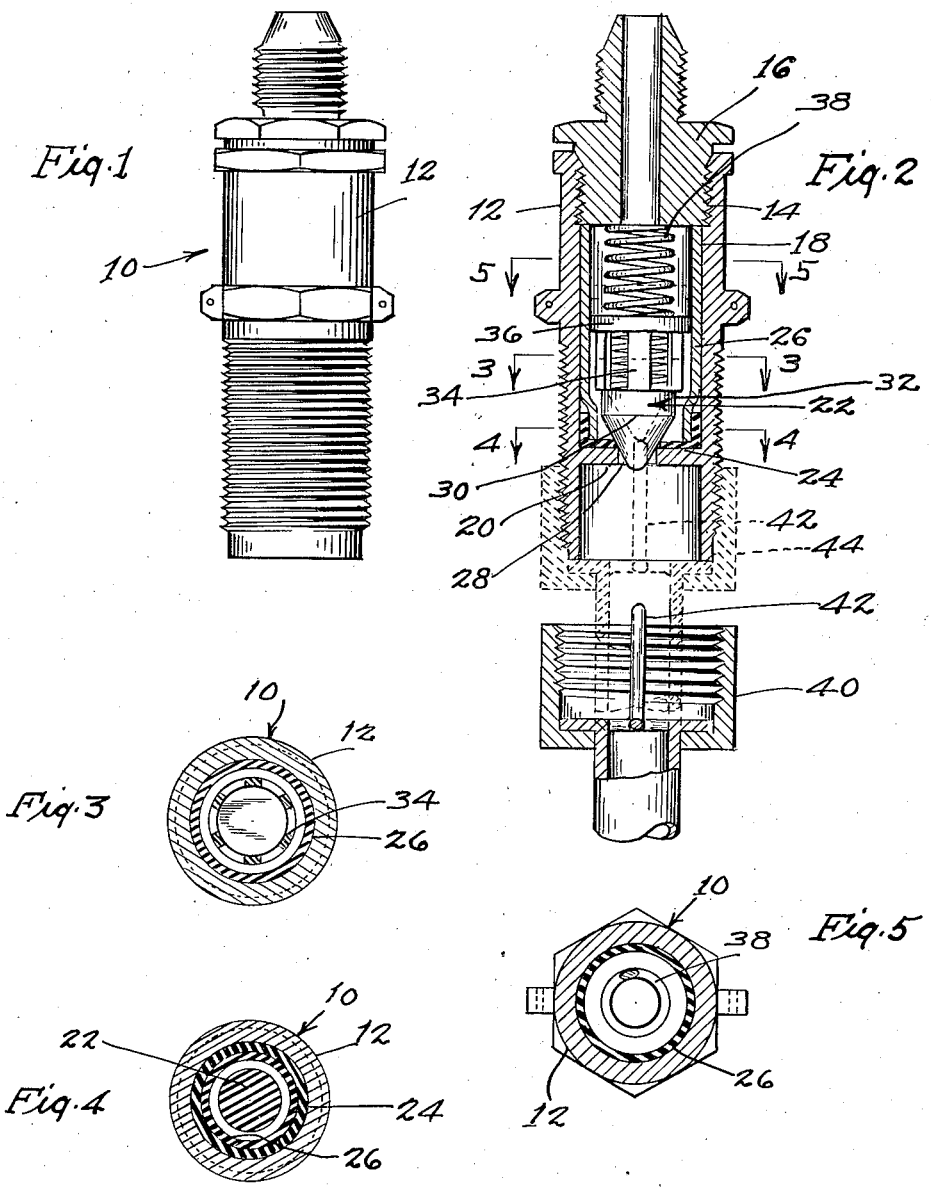
INVENTOR.
Clarence Pool
BY Robt. S. Woolsey Patented Jan. 8, 1946

2,392,501

UNITED STATES PATENT OFFICE 2,392,501

VALVE CONSTRUCTION

Clarence Pool, Rivera, Calif.

Application April 23, 1943, Serial No. 484,294

1 Claim. (Cl. 251—144)

The valve with which the present invention is concerned is a cut-off type and is primarily designed to stop the flow of fluid when a pipe or tube is temporarily opened for servicing, repair or replacement. Valves of this type are slowly and expensively made because of precision machining of all parts which meet or move in close contact.

Especially in times of national emergency such as the present, it is of the greatest importance expeditious methods be employed to increase production without impairing quality, and of course if possible to improve upon present standards.

In view of the foregoing it is a prime object of the present invention to provide a simple, reliable, efficient, light weight, self-sealing plunger type of stop-valve.

A further and more specific object of the invention is to provide a replaceable moulded valve body sleeve within which a plunger may move to and from open position as a means of greatly reducing otherwise necessary machining and honing.

A still further object of the invention is to provide in a valve of the character contemplated and in combination with a sleeve of the type above set forth, a resilient seal interposed between the plunger and a metallic valve seat, the resilient seal being held in position by said sleeve.

Other objects, features and advantages of the invention will be apparent from the accompanying drawing, the following specification and the subjoined claim.

In the drawing of which there is one sheet:

Figure 1 is a side-elevation of a valve of the type with which this invention is concerned.

Figure 2 is a longitudinal sectional elevation showing the construction and relation of the replaceable sleeve with respect to a resilient valve seat and showing in side-elevation a plunger in cooperative relationship to the above mentioned elements.

Figure 3 is a transverse sectional view taken substantially along line 3—3, in Figure 2.

Figure 4 and Figure 5 are also transverse sectional views taken along lines 4—4 and 5—5 respectively in Figure 2, showing detail of construction.

In the drawing the reference character 10 indicates a valve assembly of the type herein contemplated. The exterior of the valve body is rather extensively threaded in the present illustration for the reason that the valve is of a type of cut-off structure generally employed in the fire-walls of air-craft. The valve body being screwed into the fire-wall and then connected with incoming and out-going pipes or tubes, however, it is not necessary that the valve be placed in a fire-wall for functional use, for it can be placed with equal facility in any fluid line.

The body 12 of the valve is provided with internal threads 14 which are adapted to receive a threaded plug 16 which forms the outlet of the valve.

The inner walls 18 of the valve body 12 are roughly machined to parallelism terminating in an annular inwardly extending flange 20, which as will be subsequently shown, provides or forms a valve seat or movement limit for a plunger 22.

After the inner surfaces or wall 18 have been roughly machined, a resilient seal 24 having an apertured bottom and flange-like sides is forcibly placed upon the seat 20 and thereafter a sleeve 26 is forced within the body 12 until the one end of the sleeve rests upon the seal 24. The one end of the sleeve 26 is moulded in such form as shown in Figure 2 as to accommodate the wall portion of the seal 24. This arrangement provides a positive means for securing the seal 24 in fixed position.

The plunger 22, as shown, is formed with a tapered seating portion 28 which first compresses the circumferential edge portions of the aperture in the resilient seat 24 and thereafter comes to rest upon the apertured edge of the flange 20.

The taper of the plunger terminates approximately at point 30 and thereafter extends upwardly with cylindrical sides 32 which in turn terminate in a plural number of parallel ribs 34 inwardly spaced from the inner walls of the sleeve 26 and terminating in an annular over-hanging band 36 is sliding contact with the inner wall of the sleeve 26. A spring 38 set within the plunger and having its other end in abutment with the under side of the threaded plug 16 is adapted to normally force the plunger into seated position during those intervals in which there is no fluid circulating through the pipe or tube in which the valve is situated.

During periods of normal operation in which fluid is flowing through the valve 10, positive means are employed to lift the plunger 22 from its seat, and one such means is illustrated in the fitting 40 which is adapted to be threadedly secured upon the incoming end of the valve, and comprises a nib 42 secured within and extending upwardly from the fitting 40. When the fitting is secured in place as shown at 44 in dotted lines the nib presses against the under portion of the plunger 22, thereby unseating it and forcing it to the position shown in dotted lines, thereby enabling fluid to pass through the valve without undue hindrance or increase in pressure. However, upon disconnecting the fitting, as may be the case during repair to the system in which the valve is a part, the nib is withdrawn from pressure contact with the plunger and enabling the spring 38 to force the plunger firmly upon its seat so that fluid under back-pressure cannot flow or drip from the valve 10.

Whether the valve 10 is secured in a special fitting constituting a portion of the fire-wall of an airplane or to a detachable fitting of the general character illustrated is quite immaterial, the only consideration of material moment is the provision of means in a stop-valve of the character contemplated to eliminate drippage therefrom during those periods that the incoming line is disconnected.

Generally speaking stop-flow valves are not new per se, however, the method of forming and quickly and easily placing an inner wall or lining therein is new, and this is especially so when taken in combination with the resilient valve seat 24, for these elements acting in a true combination provide an easily made and installed, low cost valve-body lining and valve seat seal.

The lining or sleeve 26 is a moulded product and comes from the mould, cast within dimensional tolerance so that no further work need be done upon it prior to or after placement within the valve. The sleeve is of course moulded with a slightly constricted end portion to accommodate the wall thickness of the resilient valve seat cushion and this latter element is fixedly secured in functional position by the sleeve after installation in a valve body.

When the plunger 22 is spring pressed to its stop limit, it of course first comes in contact with the resilient seat 24 and compresses it to a degree sufficient to cause the seat to flow into and conform with any and all minor imperfections therein, thus automatically and effectively sealing-off any possible back flow or drippage from the valve or tubing forwardly thereof.

I claim:

In a valve, a valve body, an inwardly directed and apertured flange positioned between the ends of said valve body, a pre-moulded plastic sleeve lining the inner wall of the valve body whereby machining thereof is obviated, a resilient cup shaped secondary valve seat having an aperture in the bottom thereof and of slightly greater diameter than the diameter of the aperture in said flange, the wall of said cup being in contact with the wall of said valve body, said lining or sleeve having an end portion extending within said cup and in longitudinal end pressure contact with the bottom thereof whereby the cup is held in fixed position with respect to the aperture in said flange, and a spring pressed valve member in slidable contact with the inner wall of said sleeve and adapted to be in sealing contact with the edge of the aperture in said cup and with the edge of the aperture in said flange.

CLARENCE POOL.